(12) United States Patent
Wallner et al.

(10) Patent No.: US 6,793,241 B2
(45) Date of Patent: Sep. 21, 2004

(54) MODULAR HEADLINER AND INFLATABLE CURTAIN ASSEMBLY

(75) Inventors: John P. Wallner, Rochester Hills, MI (US); Charles S. Pillsbury, IV, Rochester, MI (US); William P. Braun, Romeo, MI (US); George E. Lancaster, Washington, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 10/136,104

(22) Filed: May 1, 2002

(65) Prior Publication Data

US 2003/0205887 A1 Nov. 6, 2003

(51) Int. Cl.$^7$ ............................................. B60R 21/22
(52) U.S. Cl. ................... 280/730.2; 280/730.1; 280/728.2; 280/741; 411/182; 403/24; 403/234; 403/256; 403/110; 403/5; 296/190; 296/189; 24/30.5; 24/455
(58) Field of Search ........................ 280/730.1, 730.2, 280/728.2, 741; 411/182; 403/24, 234, 256, 110, 5; 296/188, 189, 214, 35.2; 24/30.5, 455

(56) References Cited

U.S. PATENT DOCUMENTS

| | | | | |
|---|---|---|---|---|
| 3,897,961 A | * | 8/1975 | Leising et al. ............ 280/730.1 |
| 3,897,967 A | * | 8/1975 | Barenyi ....................... 293/120 |
| 4,373,826 A | * | 2/1983 | Inamoto et al. ................ 403/14 |
| 5,865,462 A | * | 2/1999 | Robins et al. ............ 280/730.2 |
| 5,988,678 A | * | 11/1999 | Nakamura et al. .......... 280/751 |
| 6,000,715 A | * | 12/1999 | Tschaeschke ............ 280/730.2 |
| 6,070,902 A | | 6/2000 | Kowalski et al. ........ 280/730.2 |
| 6,102,435 A | | 8/2000 | Wallner et al. .......... 280/730.2 |
| 6,103,984 A | | 8/2000 | Bowers et al. ........... 280/730.2 |
| 6,106,006 A | * | 8/2000 | Bowers et al. ........... 280/730.2 |
| 6,135,491 A | | 10/2000 | Olson et al. ............. 280/730.2 |
| 6,142,509 A | * | 11/2000 | White, Jr. et al. ....... 280/730.2 |
| 6,149,185 A | | 11/2000 | White, Jr. et al. ....... 280/728.2 |
| 6,155,597 A | * | 12/2000 | Bowers et al. ........... 280/730.2 |
| 6,168,193 B1 | * | 1/2001 | Shirk et al. .............. 280/730.2 |
| 6,173,990 B1 | | 1/2001 | Nakajima et al. ........ 280/730.2 |
| 6,176,515 B1 | * | 1/2001 | Wallner et al. .......... 280/730.2 |
| 6,203,058 B1 | * | 3/2001 | Elqadah et al. .......... 280/730.2 |
| 6,206,412 B1 | * | 3/2001 | Swann et al. ............ 280/730.2 |
| 6,227,561 B1 | | 5/2001 | Jost et al. ................ 280/730.2 |
| 6,231,071 B1 | * | 5/2001 | Keane ..................... 280/730.2 |
| 6,237,939 B1 | * | 5/2001 | Resh ....................... 280/730.2 |
| 6,273,458 B1 | * | 8/2001 | Steffens, Jr. et al. ..... 280/730.2 |
| 6,293,581 B1 | * | 9/2001 | Saita et al. .............. 280/730.2 |
| 6,308,982 B1 | * | 10/2001 | Wallner et al. .......... 280/730.2 |

(List continued on next page.)

FOREIGN PATENT DOCUMENTS

DE          10028415        * 3/2001

Primary Examiner—Michael J. Carone
Assistant Examiner—John Richardson
(74) Attorney, Agent, or Firm—Tarolli, Sundheim, Covell & Tummino L.L.P.

(57) ABSTRACT

A modular headliner assembly (10) includes an inflatable vehicle occupant protection device (14) adapted to inflate away from a roof (18) of a vehicle (12) into a position between a side structure (16) of the vehicle and a vehicle occupant. The modular headliner assembly (10) also includes a headliner (36) for covering an interior portion (38) of the roof (18) and at least one support device (40) for supporting the inflatable vehicle occupant protection device (14) and the headliner in the vehicle (12). The support device (40) includes a bracket (42) having a portion (44) connectable to the inflatable vehicle occupant protection device (14), fastener (202) for connecting the headliner (36) to the bracket, and a fastener (222) for connecting the bracket to the vehicle (12).

24 Claims, 7 Drawing Sheets

U.S. PATENT DOCUMENTS

| | | | |
|---|---|---|---|
| 6,336,651 B1 * | 1/2002 | Mramor et al. | 280/728.2 |
| 6,343,811 B1 * | 2/2002 | Hammer et al. | 280/730.2 |
| 6,364,349 B1 * | 4/2002 | Kutchey et al. | 280/730.2 |
| 6,409,211 B1 * | 6/2002 | Sheng et al. | 280/730.2 |
| 6,431,587 B1 * | 8/2002 | O'Docherty | 280/730.2 |
| 6,431,588 B1 * | 8/2002 | Bayley et al. | 280/730.2 |
| 6,435,543 B1 * | 8/2002 | Magoteaux et al. | 280/730.2 |
| 6,450,529 B1 * | 9/2002 | Kalandek et al. | 280/730.2 |
| 6,471,240 B2 * | 10/2002 | Bakhsh et al. | 280/729 |
| 6,474,681 B2 * | 11/2002 | Peer et al. | 280/730.2 |
| 6,481,743 B1 * | 11/2002 | Tobe et al. | 280/728.2 |
| 6,505,853 B2 * | 1/2003 | Brannon et al. | 280/730.2 |
| 6,575,528 B2 * | 6/2003 | Tiesler et al. | 296/214 |

* cited by examiner

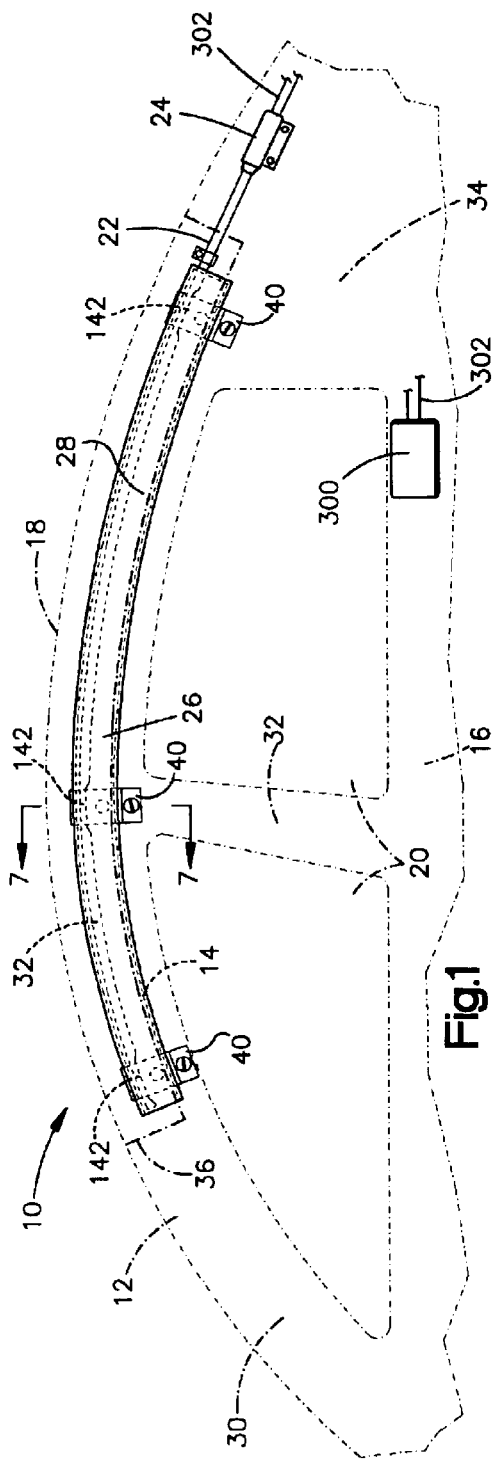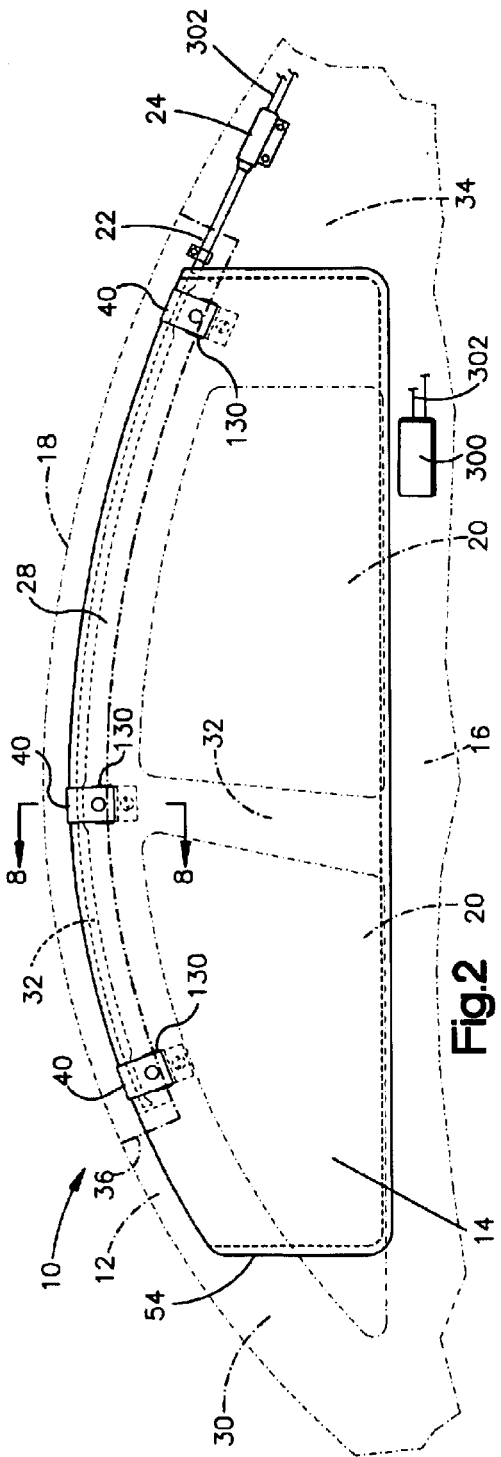

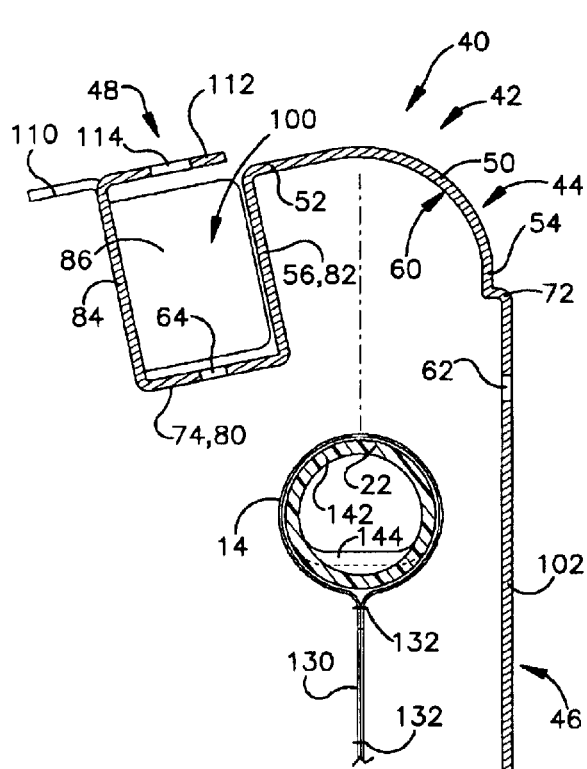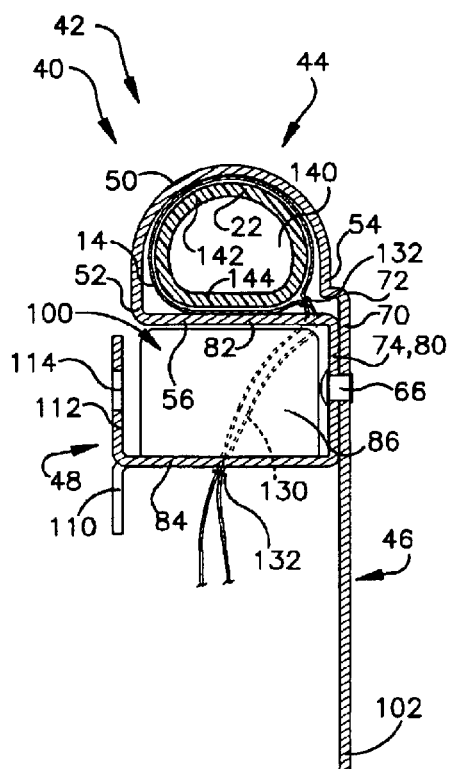

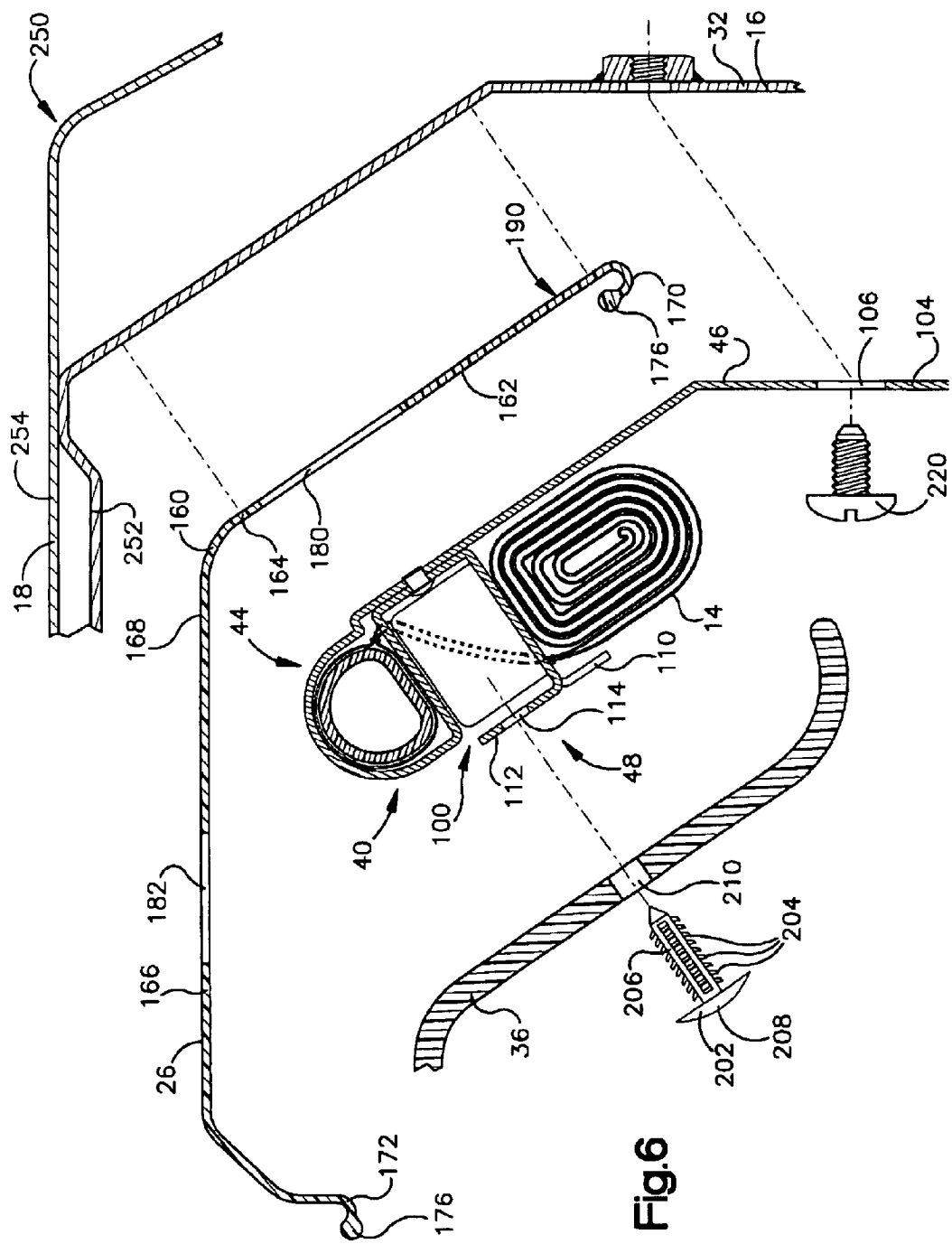

MODULAR HEADLINER AND INFLATABLE CURTAIN ASSEMBLY

FIELD OF THE INVENTION

The present invention relates to a vehicle headliner and an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. Such known inflatable curtains are typically stored in a housing that opens upon inflation of the inflatable curtain. A known inflatable curtain is inflated from a deflated condition by inflation fluid directed from an inflator to the inflatable curtain.

The inflatable curtain is typically stored in a deflated condition along the roof rail above the side windows of the vehicle. The inflatable curtain is connected to the sheet metal of the vehicle and then is covered with a vehicle trim piece, such as a side trim panel. A headliner typically overlies an interior surface of the vehicle roof and extends laterally across the vehicle roof. The headliner may also help cover the inflatable curtain.

SUMMARY OF THE INVENTION

The present invention relates to a modular headliner assembly that includes an inflatable vehicle occupant protection device adapted to inflate away from a roof of a vehicle into a position between a side structure of the vehicle and a vehicle occupant. The modular headliner assembly also includes a headliner for covering an interior portion of the roof and at least one support device for supporting the inflatable vehicle occupant protection device and the headliner in the vehicle. The support device includes a bracket having a portion connectable to the inflatable vehicle occupant protection device, fastener for connecting the headliner to the bracket, and a fastener for connecting the bracket to the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus including a modular headliner and inflatable curtain assembly illustrating the protection device in a deflated condition, according to the present invention;

FIG. 2 is a schematic view of the apparatus of FIG. 1 illustrating the inflatable curtain in an inflated condition;

FIGS. 4 and 5 are schematic views depicting the assembly of a portion of the apparatus of FIG. 1;

FIG. 6 is an exploded sectional view depicting the assembly of the apparatus of FIG. 1;

DESCRIPTION OF PREFERRED EMBODIMENTS

Figure 3:
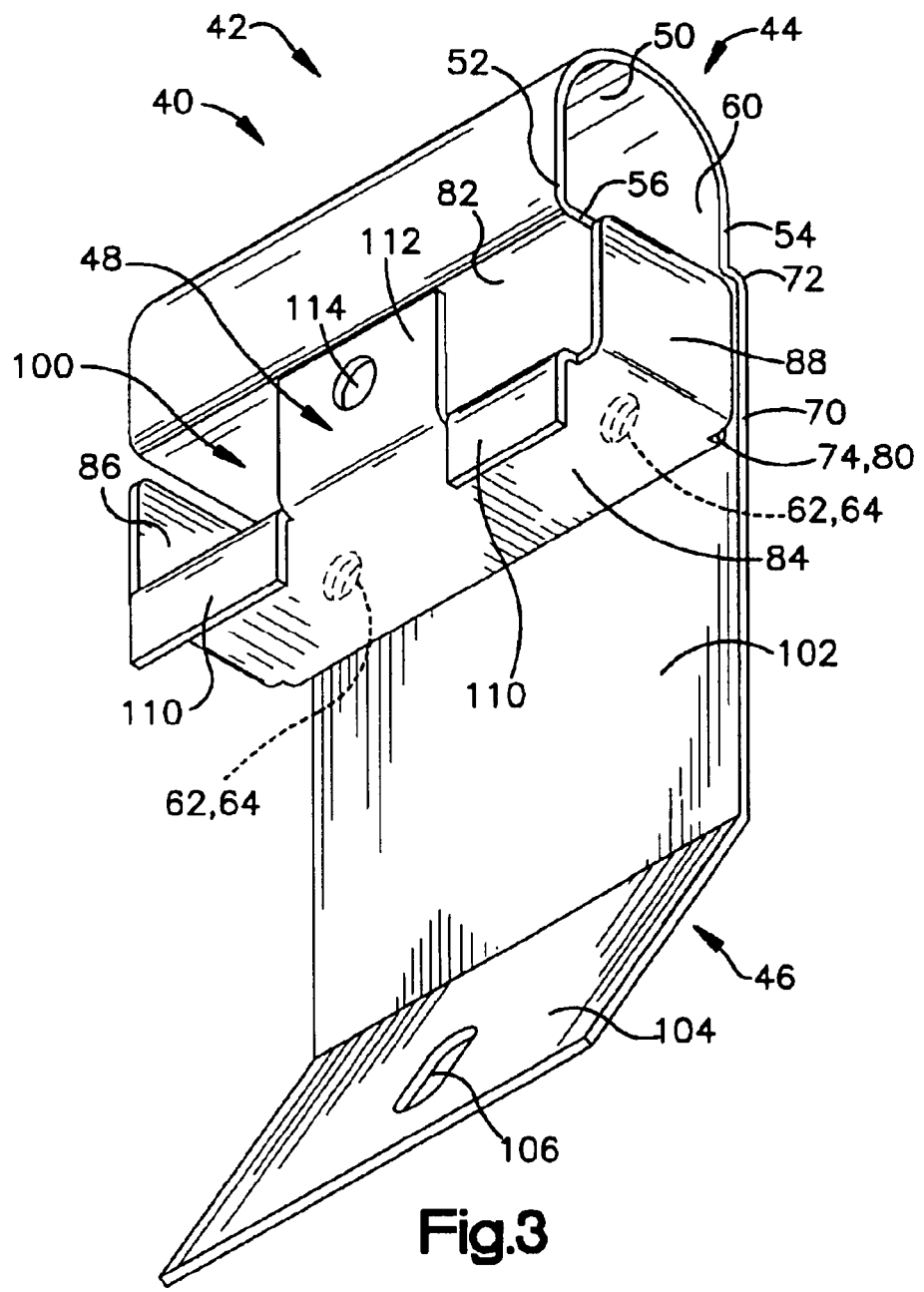
FIG. 3 is a perspective view of a portion of the apparatus of FIG. 1.

As representative of the present invention, an apparatus including a modular headliner and inflatable curtain assembly (hereinafter referred to as a modular headliner assembly 10) is schematically depicted in FIGS. 1 and 2. The modular headliner assembly 10 includes a vehicle headliner 36 connected to an inflatable curtain module 28 by at least one support device 40. The support devices 40 also connect the modular headliner assembly 10 to the vehicle 12. The inflatable curtain module 28 includes an inflatable vehicle occupant protection device in the form of an inflatable curtain 14 and a fill tube 22 for directing inflation fluid from an inflator 24 into the inflatable curtain. The inflatable curtain module 28 may also include a housing 26 (FIG. 1) that stores the inflatable curtain in a deflated condition along with the fill tube 22.

The side structure 16 of the vehicle 12 includes side windows 20, an A pillar 30, a B pillar 32, and a C pillar 34. When the modular headliner assembly 10 is installed in the vehicle 12, the inflatable curtain module 28 extends along the vehicle roof 18 and along the side structure 16 of the vehicle 12 above the side windows 20, and the headliner 36 overlies an interior surface 38 of the roof 18.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

Generally speaking, the inflatable curtain 14 may have any construction suitable for helping to protect an occupant of a vehicle in the event of a side impact to the vehicle or a vehicle rollover. For example, the inflatable curtain 14 may comprise fabric panels woven together as a single piece of material to define inflatable chamber(s) of the curtain. Alternatively, the inflatable curtain 14 may comprise separate panels, constructed of fabric, elastomers, plastic films, or other suitable materials, that are interconnected by means such as stitching, ultrasonic welding, heat bonding, adhesives, etc. to define inflatable chamber(s) of the curtain. The inflatable curtain 14 may have a single layer construction or may have multiple layers of identical or different materials. The inflatable curtain 14 may also be coated with a gas impermeable material.

Each support device 40 includes a bracket 42, a fastening device for connecting the headliner 36 to the bracket, and a fastener for connecting the bracket to the vehicle 12. As illustrated in FIGS. 3–5, each bracket 42 includes a clamp portion 44, a flange portion 46, and a headliner support portion 48. Preferably, the bracket 42 is constructed of a single piece of metal material that is cut in a predetermined pattern and folded or bent to form the clamp portion 44, flange portion 46, and headliner support portion 48. Those skilled in the art, however, will recognize that alternative materials, such as plastic, may be used to construct the bracket 42. It will also be recognized that the configuration of the clamping portion 44, flange portion 46, and the headliner support portion 48 of the bracket 42 may vary depending on factors such as the structure of the headliner 36, inflatable curtain module 28 and the vehicle 12.

The clamp portion 44 includes an arcuate portion 50 having opposite first and second radial ends 52 and 54, respectively. A flat portion 56 of the clamp portion 44 extends from the first radial end 52 of the arcuate portion 50. When the bracket 42 is in the closed position of FIGS. 3 and 5, the flat portion 56 extends to adjacent the second radial end 54 of the arcuate portion 50. The clamp portion 44 also includes an inner clamping surface 60.

The flange portion 46 extends from the second radial end 54 of the arcuate portion 50 in a direction perpendicular to the flat portion 56 when the bracket 42 is in the closed position (FIGS. 3 and 5). The flange portion 46 is offset from the arcuate portion 50 by a shoulder portion 72. A clamping flange 74 extends from an end of the flat portion 56 in a direction perpendicular to the flat portion. When the bracket 42 is in the closed position of FIGS. 3 and 5, the clamping flange 74 is positioned in an adjacent, generally parallel, overlying relationship with the flange portion 46. The flange portion 46 extends beyond the clamping flange 74 and includes a housing support portion 102 and an angled mounting portion 104. The mounting portion 104 includes a fastener receiving aperture 106.

The headliner support portion 48 includes a rectangular bottom wall 80 formed by the clamping flange 74. First and second opposite side walls 82 and 84 and first and second opposing end walls 86 and 88 extend perpendicularly from the bottom wall 80 to form a chamber 100 of the bracket 42. The first side wall 82 is defined by the flat portion 56 of the clamping portion 50. The second side wall 84 extends perpendicularly from the clamping flange 74 in a direction parallel to the first side wall 82. The first and second end walls 86 and 88 consist of folded end portions of the second side wall 84 that extend perpendicularly from the second side wall to adjacent the first side wall 82.

First headliner support flanges 110 extend perpendicularly from an edge of the second side wall 84 opposite the bottom wall 80 in a direction away from the chamber 100. A second headliner support flange 112 extends perpendicularly from an edge of the second side wall 84 opposite the bottom wall 80 in a direction towards the first side wall 82. The second headliner support flange 112 includes a headliner fastener aperture 114.

Referring to FIGS. 3 and 4, the flange portion 46 includes a pair of flange fastening apertures 62. The clamping flange 74 also includes a pair of flange fastening aperture 64. As indicated by the dashed lines in FIG. 3, the flange fastening apertures 62 and 64 are positioned in the chamber 100 in alignment with spaces on opposite sides of the second headliner support flange 112. This provides access into the chamber 100 and to the flange fastening apertures 62 and 64 which, for example, may provide access to the apertures for a device such as a tool.

Referring to FIGS. 2, 4, and 5, the inflatable curtain 14 includes clamp apertures 130 spaced along its length. Each clamp aperture 130 extends entirely through the inflatable curtain 14. A tightly stitched sew line 132 (FIGS. 4 and 5) completely encircles each aperture 130. The sew line 132 helps to block leakage of the inflation fluid from the inflatable curtain 14 when the inflatable curtain is inflated.

The fill tube 22 is generally cylindrical in shape and includes a series of clamp sections 140 spaced along its length. The cylindrical fill tube 22 is flattened on one side along the extent of each clamping section 140. Thus, the fill tube 22 has an arcuate wall portion 142 and a flat wall portion 144 along the length of each clamp section 140. Referring to FIGS. 1 and 2, the clamp apertures 130 are spaced along the inflatable curtain 14 so as to coincide with the spacing of the clamp sections 140 on the fill tube 22. The clamp apertures 130 are thus positioned adjacent the clamp sections 140 when the fill tube 22 is fully inserted into the inflatable curtain 14.

The inflatable curtain module 28, i.e., the inflatable curtain 14, fill tube 22, and housing 26, is assembled with the support devices 40. Generally speaking, each support device 40 is used in a similar or identical manner to assemble the inflatable curtain module 28. Accordingly, assembly of the inflatable curtain module 28 with one of the support devices 40 is described herein.

The fill tube 22 is inserted into the inflatable curtain 14. As illustrated in FIG. 4, in an opened condition of the bracket 42, the clamping flange 74 is spaced apart from the flange portion 46. The fill tube 22 and the inflatable curtain 14 are presented towards the inner clamping surface 60 of the clamp portion 44 such that the clamp section 140 of the fill tube is positioned within the clamp portion. Once the fill tube 22 and inflatable curtain are inserted into the clamp portion 44, as indicated by the dot-dash line in FIG. 4, the flange portion 46 and the clamping flange 74 are moved together, thus placing the bracket 42 in the closed position of FIG. 5.

When the bracket 42 is in the closed position with the inflatable curtain 14 and the fill tube 22 in the clamp portion 44, the arcuate portion 50 of the clamp portion 44 is positioned adjacent the arcuate wall portion 142 of the clamp section 140. The flat portion 56 of the clamp portion 44 is positioned adjacent the flat wall portion 144 of the clamp section 140.

When the flange portion 46 and the clamping flange 74 are moved together, they become positioned adjacent one another and the flange fastening apertures 62 and 64 become aligned with each other. A fastener 66, such as a rivet, may thus be installed to extend through the apertures 62 and 64 to secure the flange portion 46 to the clamping flange 74. This helps to maintain the bracket 42 clamped onto the fill tube and the inflatable curtain 14. Alternative means, such as spot welding or a mechanical clinch connection, may also be used to secure the flange portion 46 to the clamping flange 74. In this instance, the flange fastening apertures 62 and 64 may not be necessary and may thus be omitted.

When in the condition of FIG. 5, the first and second side walls 82, 84, and the end walls 86, 88 extend through the aperture 130 in the inflatable curtain 14. The clamp portion 44 of the bracket 42 encircles the fill tube 22 along the clamping section 140 of the fill tube 22. The portion of the inflatable curtain 14 (FIG. 4) surrounding the fill tube 22 is disposed between the inner clamping surface 60 of the clamping portion 44 and the fill tube. When closed around the fill tube 22 and the inflatable curtain 14, the clamping portion 44 may undergo plastic deformation, which may help to maintain the bracket 42 in the closed position. The inner clamping surface 60 of the clamp portion 44 clamps onto the fill tube 22 and the inflatable curtain 14. The fill tube 22, having a cylindrical configuration on either side of the clamping section 140, helps prevent the support device 40 from sliding or otherwise moving axially along the tube.

Figure 7:
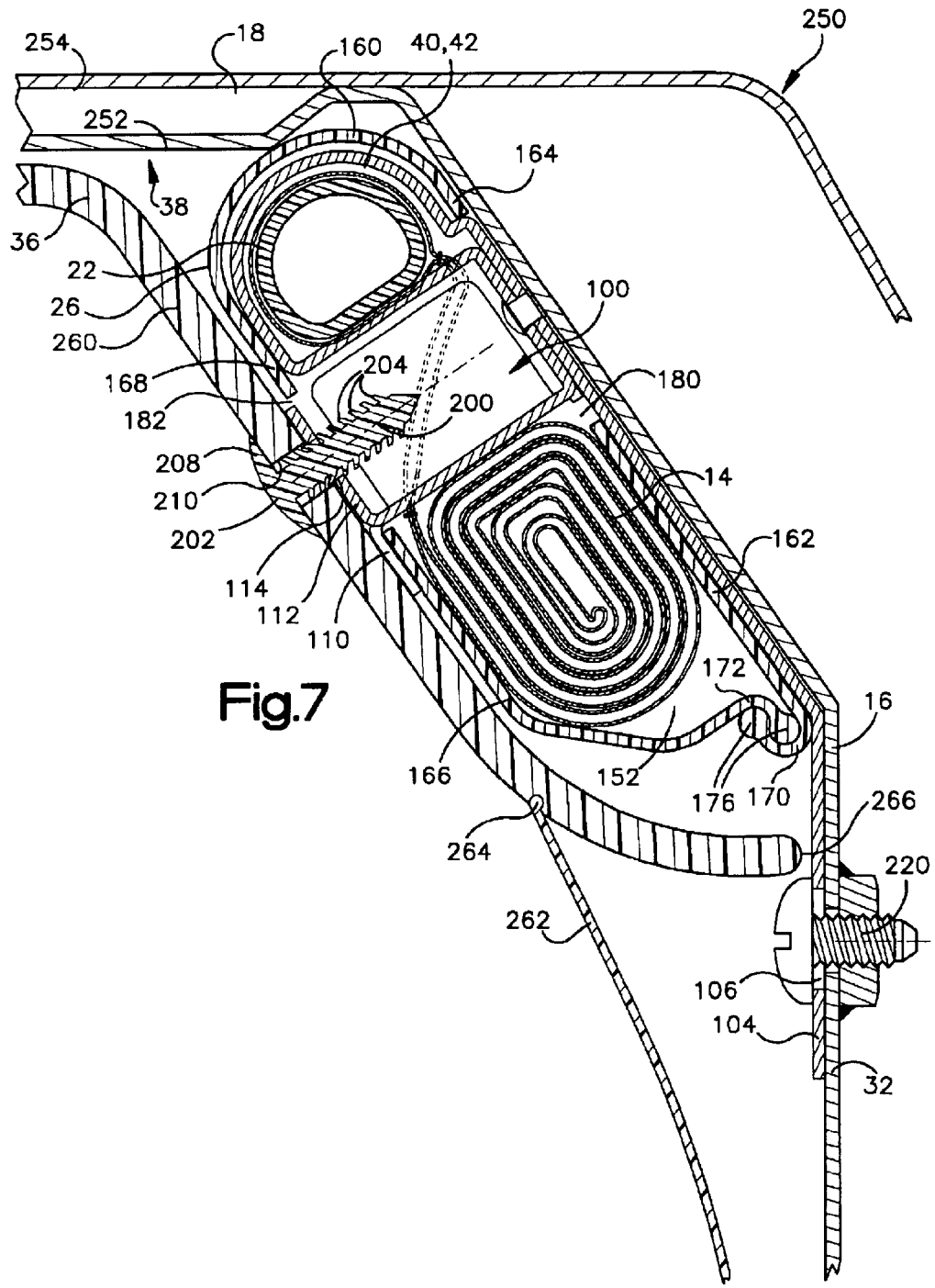
FIG. 7 is a sectional view of the apparatus taken generally along line 7—7 in FIG. 1.
Figure 8:
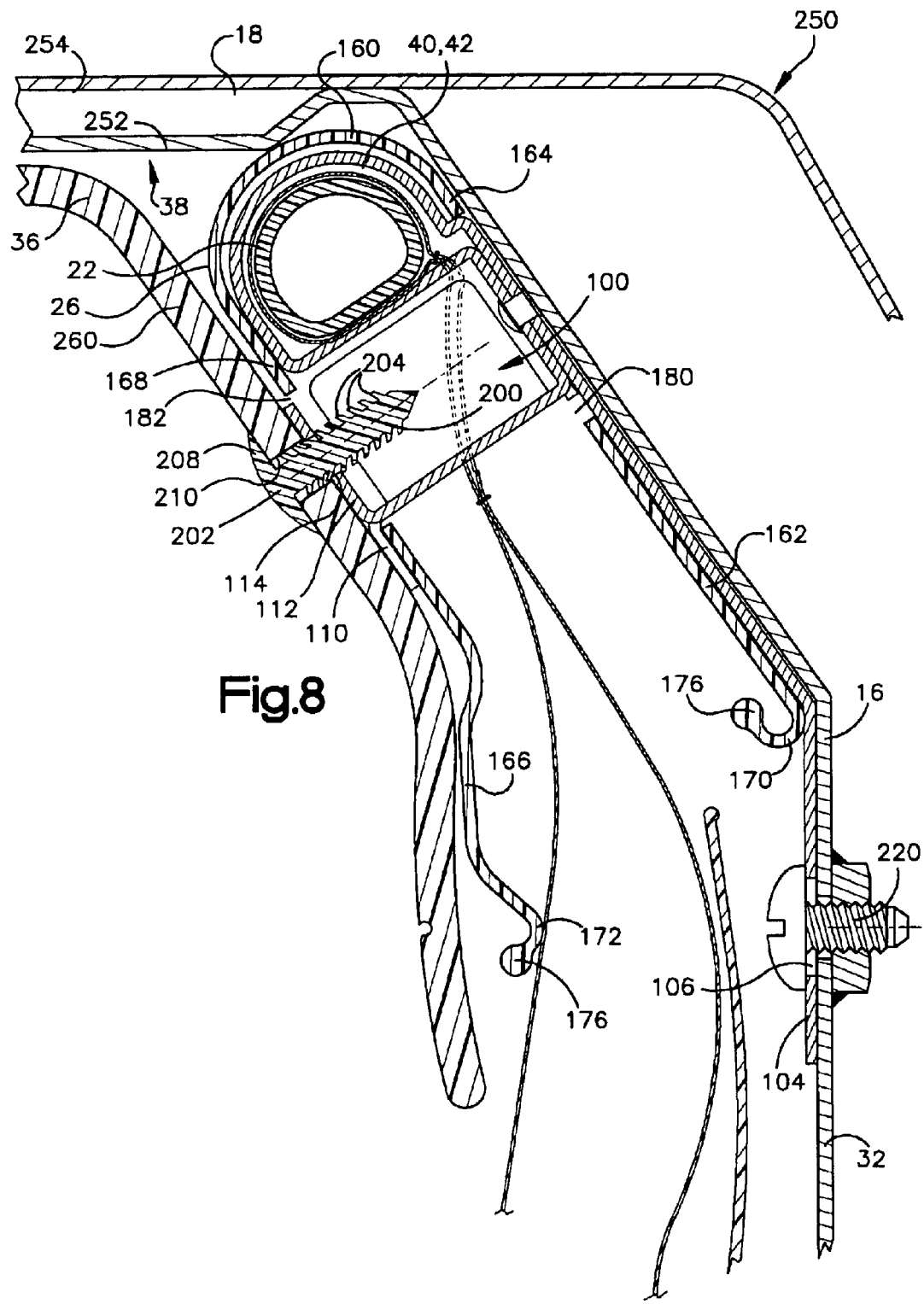
FIG. 8 is a sectional view of the apparatus taken generally along line 8—8 in FIG. 2.

The housing 26 is preferably constructed of a single piece of homogeneous plastic material formed, for example, by extrusion or molding. Referring to FIGS. 6–8, the housing 26 includes an arc-shaped end portion 160. An outer wall portion 162 extends from a first terminal end 164 of the end portion 160. An inner wall portion or closure flap 166 extends from a second terminal end 168 of the end portion 160, opposite the first terminal end 164.

A terminal longitudinal edge 170 of the outer wall portion 162 is interconnectable with a terminal longitudinal edge 172 of the closure flap 166 by means such as interlocking beads 176. The closure flap 166, when connected to the outer wall portion 162 (FIG. 7), at least partially encloses the inflatable curtain 14 in a folded and stored condition in the housing 26 along with at least a portion of the fill tube 22.

The outer wall portion 162, closure flap 166, and the beads 176 may extend substantially along the entire length of the housing 26. This may be the case, for example, if the housing 26 has an extruded plastic construction. Those skilled in the art, however, will recognize that certain ones of these elements may not extend along the entire length of the housing 26. For example, the beads 176 may be located intermittently along the length of the housing 26. This may be the case, for example, if the housing 26 has a molded plastic construction.

Portions of the outer wall portion 162 and closure flap 166 may be removed along the length of the housing 26 so that portions of the support devices 40, particularly the brackets 42, can extend through the housing 26. These housing portions may be cut away from an extruded housing or molded integrally in a molded housing. Referring to FIGS. 6–8, the outer wall 162 includes an opening 180 and the closure flap 166 includes an opening 182.

The housing 26 is positioned around the assemblage of the brackets 42 clamped onto the inflatable curtain 14 and fill tube 22. The spacing of the openings 180 and 182 of the housing 26 coincides with the spacing of the clamp apertures 130 in the inflatable curtain 14 and the clamping portions 140 of the fill tube 22. The flange portion 46 of each bracket 42 extends through the opening 180 in the outer wall portion 162 and is positioned adjacent and overlying an outer surface of the outer wall portion. The first headliner support flange 110 extends through the opening 182 in the closure flap 166 and is positioned adjacent and overlying a portion of an outer surface of the closure flap. The second headliner support flange 112 is positioned at least partially in the opening 182 in the closure flap 166 such that the headliner fastener aperture 114 is exposed in the opening.

The support device 40 also includes a fastener 202 for connecting the headliner 36 to the headliner support portion 48 of the bracket 42. As illustrated in FIGS. 6–8, the fastener 202 may comprise a push-in "fir tree" type fastener. The fastener 202 is constructed of a resilient material, such as plastic, and includes a plurality of deflectable rims or prongs 204 extending radially and at an acute angle from a shaft 206 of the fastener. The fir tree fastener 202 also includes a head portion 208.

An opening 210 in the headliner 36 is aligned with the opening 114 in the second headliner support flange 112. The fir tree fastener 202 is pushed through the aligned openings 210 and 114 and into the chamber 100 to connect the headliner 36 to the bracket 42. As the shaft 206 passes through the openings 210 and 114, the prongs 204 deflect towards the shaft, thus allowing the fastener 202 to pass through the openings. Once through the openings 210 and 114, the prongs 204 spring back towards their normal resting position. If the fastener 202 is urged back out of the openings 210 and 114, such as if the headliner 36 pulls on the head portion 208, the prongs are deflected away from the shaft 206 and create an interference with the second headliner support flange 112. This helps prevent the fastener 202 from being pulled out of the openings 210 and/or 114. The fir tree fastener 202 thus connects the headliner 36 to the inflatable curtain module 28 to form the modular headliner assembly 10.

Figure 9:
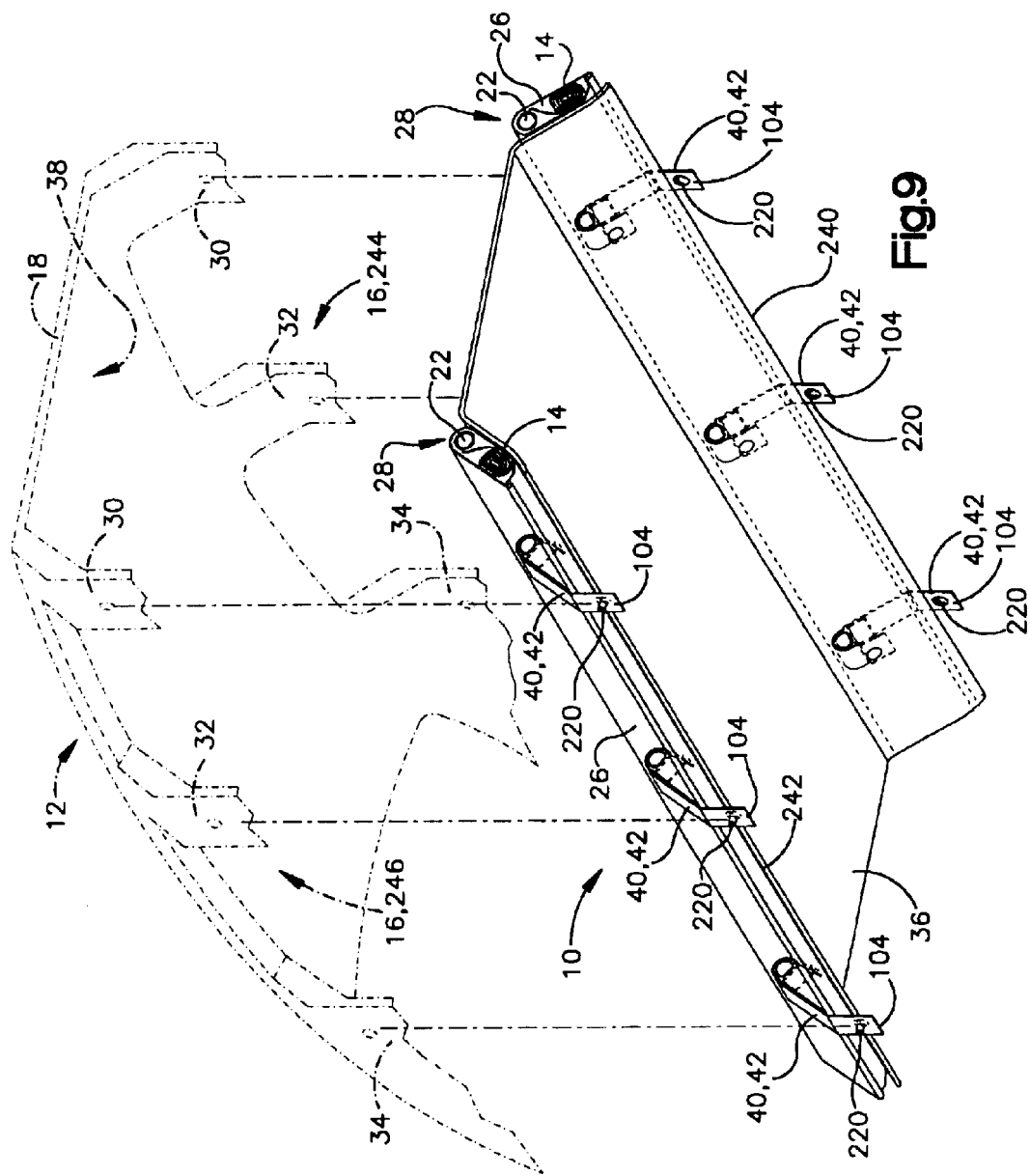
FIG. 9 is a schematic perspective view of the apparatus of FIG. 1.

The modular headliner assembly 10 may be installed in the vehicle 12 as a single unit. This is best illustrated in FIG. 9. As shown in FIG. 9, the modular headliner assembly 10 is positioned in the vehicle 12 such that the headliner overlies an interior surface 38 of the vehicle roof 18. When installed, the headliner 36 has first and second longitudinal edges 240 and 242 that extend adjacent the intersection of the vehicle roof 18 and first and second side structures 244 and 246 (i.e., driver side and passenger side), respectively, of the vehicle 12. As shown in FIG. 9, the support devices 40 are spaced to coincide with the A, B, and C pillars 30, 32, and 34 of both the first and second side structures 244 and 246. This spacing could, however, be different. For example, a support device 40 may be positioned along the intersection of the side structure 16 and the roof 18 between the vehicle pillars. The support devices 40 include fasteners 220 (see also FIGS. 6–8), such as screws or bolts, that connect the support devices to their respective vehicle pillars.

The connection of the modular headliner assembly 10 to the vehicle is illustrated in detail in FIGS. 7 and 8. A vehicle roof rail 250 is located at the intersection of the side structure 16 of the vehicle and the vehicle roof 18. The side structure 16, roof 18 and roof rail 250 are formed from pieces of sheet metal that are stamped or otherwise formed into predetermined shapes and welded or otherwise connected to form a desired structure. In the embodiment illustrated in FIGS. 7 and 8, inner and outer pieces of sheet metal 252 and 254, respectively, are used to form the side structure 16, roof 18, roof rail 250, and B pillar 32 of the vehicle 12. Those skilled in the art will appreciate, however, that the side structure 16, roof 18, roof rail 250, and B pillar 32 may have alternative constructions.

The fasteners 220 connect the flange portion 46 of the bracket 42 to the side structure 16 of the vehicle 12 to connect the modular headliner assembly 10 to the vehicle 12. More specifically, each fastener 220 extends through the aperture 106 in the mounting portion 104 of the flange portion 46 to connect the bracket 42 to the vehicle 12. In the embodiment illustrated in FIG. 8, the fastener 220 is a screw that connects the bracket 42 to the B pillar 32 of the vehicle 12.

When in the installed position of FIG. 7, the headliner 36 extends along the inner surface 38 of the roof 18 of the vehicle. The headliner 36 has a portion 260 that extends at an acute angle relative to the roof 18 adjacent the closure flap 166 of the housing 26. The headliner 36 terminates at an edge 266 that is positioned vertically above (as viewed in FIGS. 7 and 8) the fastener 220 and the fastener aperture 106 on the mounting portion 104. As shown in FIGS. 7 and 9, this provides a clearance wherein the mounting portions 104 are exposed, which helps facilitate installation of the modular headliner assembly 10 in the vehicle 12.

A vehicle trim piece 262 overlaps the headliner 36 and has a tab 264 that connects the trim piece to the headliner once the modular headliner assembly 10 is installed in the vehicle 12. In the embodiment illustrated in FIGS. 7 and 8, the trim piece 262 overlies the B pillar 32 of the vehicle 12. Similar trim pieces (not shown) may also overlie the A pillar 30 (FIGS. 1 and 2) and C pillar 34 of the vehicle 12. Also, other trim pieces (not shown) may overlie portions of headliner between the vehicle pillars along the vehicle side structure 16. The configuration of the vehicle structure and the spatial and interconnecting relationships between the vehicle structure, the modular headliner assembly 10, and trim piece 262 at these locations may be similar to that illustrated in FIG. 7.

The vehicle 12 includes a sensor mechanism 300 (shown schematically in FIGS. 1 and 2) for sensing a side impact to the vehicle 12 and/or a rollover of the vehicle 12. The sensor mechanism 300 actuates the inflator 24 in response to the sensing of a side impact or a vehicle rollover. In the event of a rollover of the vehicle or a side impact to the vehicle 12 for which inflation of the curtain 14 is desirable, the sensor mechanism 300 provides an electrical signal over lead wires 302 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. The beads 176 on the outer wall portion 162 and the closure flap 166 separate under the pressure of the inflation fluid, and the housing 26 opens. The inflatable curtain 14 inflates away from the roof 18 in a downward direction as shown in the drawings and in a downward direction with respect to the direction of forward travel of the vehicle 12 into the position illustrated in FIGS. 2 and 8.

When the housing 26 opens, the inflating curtain 14 causes the closure flap 166 to move in a direction generally away from the vehicle side structure 16 and roof rail 250 into the position illustrated in FIG. 8. As the closure flap 166 moves from the position of FIG. 7 to the position of FIG. 8, the closure flap causes the portion 260 of the headliner 36 to move in a direction generally away from the side structure 16 and roof rail 250 into the position illustrated in FIG. 8. This creates a space between the outer wall portion 162 and the closure flap 166, and between the headliner 36 and trim piece 262, through which the inflatable curtain 14 may extend during inflation and while in the inflated condition.

The inflatable curtain 14, when inflated, extends along the side structure 16 of the vehicle 12 and is positioned between the side structure and any occupant of the vehicle. The inflatable curtain 14 helps to protect a vehicle occupant in the event of a vehicle rollover or a side impact to the vehicle 12. The inflatable curtain 14, when inflated, helps to absorb the energy of impacts with the curtain and helps to distribute the impact energy over a large area of the curtain.

From the above description of the invention, those skilled in the art will perceive improvements, changes and modifications. For example, it will be appreciated that the configuration of the vehicle structure and, thus, the spatial and interconnecting relationships between parts such as the vehicle side structure 16, roof 18, roof rail 250, trim pieces, and the components of the modular headliner assembly 10 may vary depending upon the particular vehicle. Therefore, it should be recognized that the various structures shown in the illustrated embodiment and the spatial and interconnecting relationships between those structures is for illustrative purposes and may vary without departing from the spirit of the present invention. Such improvements, changes and modifications within the skill of the art are intended to be covered by the appended claims.

What is claimed is:

1. Apparatus for helping to protect an occupant of a vehicle including vehicle structure that includes a side structure, a roof, and a roof rail, said apparatus comprising:

a pre-assembled unit comprising (i) an inflatable vehicle occupant protection device that is adapted to inflate away from the vehicle roof into a position between the side structure and a vehicle occupant, (ii) a headliner for covering an interior portion of the vehicle roof, (iii) at least one support bracket separate from the vehicle structure and connectable with the vehicle structure to support said inflatable vehicle occupant protection device and said headliner in the vehicle, and (iv) first fastening means consisting of releasable fastening means for connecting said headliner to said bracket; and second fastening means spaced apart from and separate from said first fastening means for connecting said pre-assembled unit to the vehicle structure.

2. Apparatus as recited in claim 1, further comprising a fill tube having a portion located in said inflatable vehicle occupant protection device, said fill tube directing inflation fluid into said inflatable vehicle occupant protection device to inflate said inflatable vehicle occupant protection device, said portion of said bracket being connectable to said fill tube and said inflatable vehicle occupant protection device.

3. The apparatus recited in claim 2, further comprising an inflation fluid source for providing said inflation fluid for inflating said inflatable vehicle occupant protection device, said fill tube directing said inflation fluid from said inflation fluid source into said inflatable vehicle occupant protection device.

4. Apparatus as recited in claim 2, wherein said portion connectable to said fill tube and said inflatable vehicle occupant protection device comprises a clamp portion of said bracket, said clamp portion extending around portions of said fill tube and said inflatable vehicle occupant protection device and clamping onto said fill tube and said inflatable vehicle occupant protection device.

5. Apparatus as recited in claim 4, wherein said bracket further comprises a flange portion extending from said clamp portion, said flange portion receiving said second fastening means.

6. Apparatus as recited in claim 5, wherein said bracket comprises a single piece of metal material, said clamp portion comprising a portion of said metal material plastically deformed around said fill tube and said inflatable vehicle occupant protection device to clamp onto said fill tube and said inflatable vehicle occupant protection device.

7. Apparatus as recited in claim 6, wherein said portion of said metal material plastically deformed around said fill tube and said inflatable vehicle occupant protection device comprises a portion of said metal material bent around said fill tube and said inflatable vehicle occupant protection device.

8. Apparatus as recited in claim 1, further comprising a housing for enclosing said inflatable vehicle occupant protection device in a stored position, said at least one support device being connectable to said housing.

9. Apparatus as recited in claim 8, wherein said bracket extends through said housing to help connect said at least one support device to said housing.

10. Apparatus as recited in claim 8, further comprising a fill tube having a portion located in said inflatable vehicle occupant protection device, said fill tube directing inflation fluid into said inflatable vehicle occupant protection device to inflate said inflatable vehicle occupant protection device, said portion of said bracket being connectable to said fill tube and said inflatable vehicle occupant protection device, said portion of said fill tube being enclosed in said housing.

11. Apparatus as defined in claim 1, wherein said inflatable vehicle occupant protection device has a generally elongated configuration extending along the side structure of the vehicle near the intersection of the side structure and the vehicle roof, said headliner having a longitudinal edge extending along the side structure of the vehicle near the intersection of the side structure and the vehicle roof, said at least one support device connecting said inflatable vehicle occupant protection device to said headliner along said longitudinal edge.

12. Apparatus as recited in claim 11, wherein said at least one support device comprises a plurality of support devices spaced along said inflatable vehicle occupant protection device, said plurality of support devices connecting said inflatable vehicle occupant protection device to said headliner along said longitudinal edge.

13. Apparatus as recited in claim 1, wherein said second fastening means connects said bracket to the side structure of the vehicle.

14. Apparatus as recited in claim 1, wherein said second fastening means connects said bracket to a pillar of the vehicle.

15. Apparatus as recited in claim 14, wherein said pillar is one of an A pillar, B pillar and C pillar of the vehicle.

16. Apparatus as recited in claim 1, wherein said second fastening means comprises a threaded fastener.

17. Apparatus as recited in claim 1, wherein said first fastening means is a fir tree fastener.

18. The apparatus recited in claim 4, wherein said clamp portion includes overlying portions of said bracket interconnected with each other by a third fastening means, separate from said first and second fastening means.

19. The apparatus recited in claim 9, wherein said portion of said bracket connectable to said inflatable vehicle occupant protection device bracket is enclosed within said housing, said second fastening means extending through a portion of said bracket positioned outside said housing to connect said bracket to the vehicle structure.

20. Apparatus for supporting an inflatable curtain module and a headliner in a vehicle, the inflatable curtain module including an inflatable curtain and a fill tube having a portion located in said inflatable curtain, said apparatus comprising:
   a bracket having a first portion deformed around a portion of said inflatable curtain and said fill tube to clamp onto said inflatable curtain and said fill tube;
   a first fastener extendable through said headliner and said bracket to connect said headliner to said bracket; and
   a second fastener separate from said first fastener extendable through said bracket to connect said bracket to the vehicle.

21. A modular vehicle headliner assembly comprising:
   a vehicle headliner;
   an inflatable curtain module; and
   a bracket for connecting said inflatable curtain module to said headliner, said bracket having a first portion clamped onto said inflatable curtain module to connect said inflatable curtain module to said bracket;
   at least one first fastener extendable through said headliner and said bracket to connect said headliner to said bracket; and
   at least one second fastener separate from said first fasteners extendable through said bracket to connect said headliner and said inflatable curtain module to the vehicle, said first fasteners being removable to allow removal of said headliner while leaving said inflatable curtain module connected to the vehicle via said bracket.

22. The modular vehicle headliner assembly recited in claim 21, wherein said inflatable curtain module comprises:
   an inflatable curtain;
   a fill tube having a portion position within said inflatable curtain, said fill tube delivering inflation fluid into said inflatable curtain to inflate said inflatable curtain; and
   a housing for enclosing said inflatable curtain and said fill tube in a stored and deflated condition.

23. Apparatus comprising:
   a vehicle headliner having a first longitudinal edge extendable along an intersection of a first side structure of a vehicle and a roof of the vehicle, said headliner having a second longitudinal edge extendable along an intersection of a second side structure of the vehicle, opposite the first side structure, and the vehicle roof;
   a first inflatable curtain module;
   at least one first bracket having a portion clamped onto said first inflatable curtain module;
   at least one first fastener extendable through said headliner and through said first bracket to connect said headliner to said first bracket and position said first inflatable curtain module along said first longitudinal edge of said headliner;
   a second inflatable curtain module;
   at least one second bracket having a portion clamped onto said second inflatable curtain module;
   at least one second fastener extendable through said headliner and through said second bracket to connect said headliner to said second bracket and position said second inflatable curtain module along said second longitudinal edge of said headliner; and
   third fasteners for connecting said at least one first bracket and said at least one second bracket to the vehicle to connect said headliner, said first inflatable curtain module, and said second inflatable curtain module to the vehicle.

24. The apparatus recited in claim 23, wherein each of said first and second inflatable curtain modules comprises:
   an inflatable curtain;
   a fill tube having a portion position within said inflatable curtain, said fill tube delivering inflation fluid into said inflatable curtain to inflate said inflatable curtain; and
   a housing for enclosing said inflatable curtain and said fill tube in a stored and deflated condition.

* * * * *